Jan. 6, 1970  F. J. FUCHS, JR  3,487,668
SHAPING AND FORMING ARTICLES
Filed July 12, 1966  2 Sheets-Sheet 1

INVENTOR
F. J. FUCHS, JR.
BY
ATTORNEY

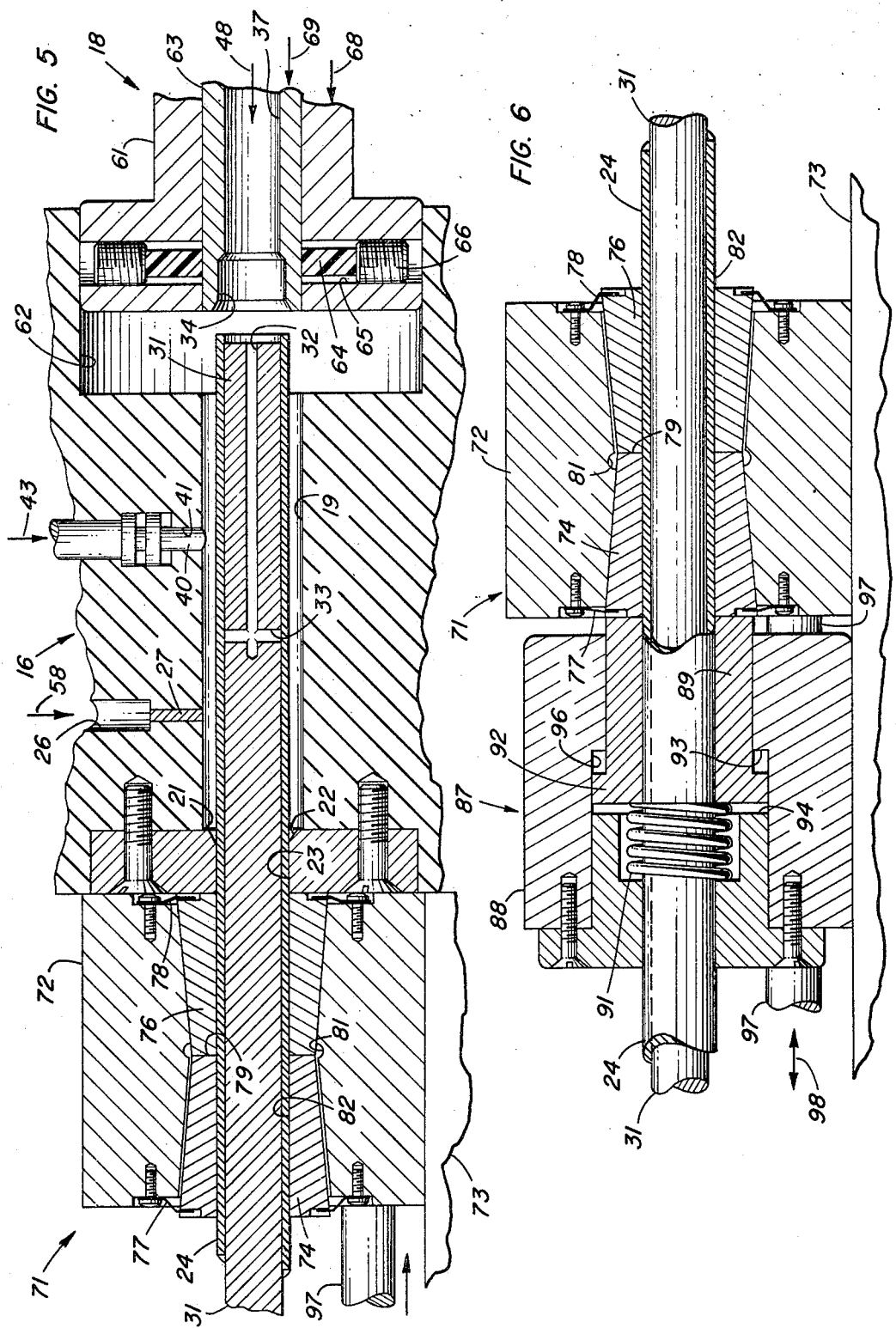

United States Patent Office 3,487,668
Patented Jan. 6, 1970

3,487,668
SHAPING AND FORMING ARTICLES
Francis Joseph Fuchs, Jr., Princeton Junction, N.J., assignor to Western Electric Company, Incorporated, New York, N.Y., a corporation of New York
Filed July 12, 1966, Ser. No. 564,646
Int. Cl. B21d 26/04, 28/28
U.S. Cl. 72—55                                    23 Claims

ABSTRACT OF THE DISCLOSURE

Method of shaping and forming an article from stock, e.g. tubular stock, by extruding back one end of the stock along its length to shape that end to a first configuration, and expanding another portion of the stock, e.g. by the internal application of high pressure to form the other portion of the stock into a second configuration. Also disclosed is a method of cutting a workpiece without resort to a female die by placing one surface of the workpiece against a wall, supporting the opposed surface of the workpiece against the wall by a pressurized fluid, and advancing a cutting member from the wall, through the workpiece and into the pressurized fluid to remove a slug from the workpiece. Apparatus is also disclosed for practicing the above-noted methods.

---

Figure 1:
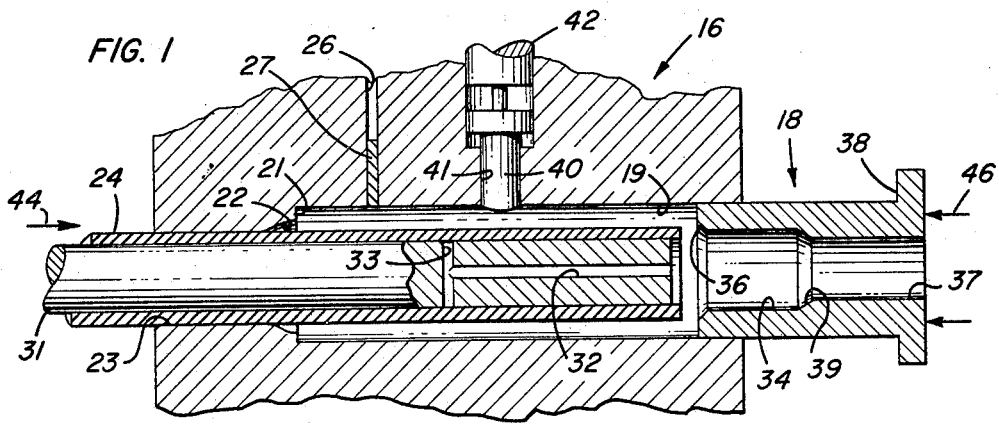

This invention relates generally to methods of and apparatus for shaping and forming articles, and more particularly, to methods of and apparatus for shaping and forming from tubular stock, in a unitary operation, an apertured tubular article having portions of differing transverse cross-sectional dimensions.

This invention also relates to methods of and apparatus for forming apertures in articles, especially tubular stock, in which one surface of the article is supported against a wall by pressurized fluid acting against the opposite surface thereof, while a punch is advanced through the wall, through the article, and into the pressurized fluid, the pressurized fluid acting in the manner of a female die.

Further, this invention relates to methods of and apparatus for shaping and forming of articles and for forming apertures in articles, which methods and apparatus utilized high hydrostatic pressure to render the material from which the article is shaped or formed more ductile, or deformable without fracture.

In the communications and other industries, countless apertured, tubular articles having portions of differing cross-sectional dimensions are used. Examples are coaxial cable connectors, telephone jack plugs, and the like. This invention will be illustrated in the manufacture of one such article, a coaxial cable connector, it being understood that a host of other apertured articles having portions of differing transverse cross-sectional dimensions may be manufactured in accordance with this invention.

In the manufacture of coaxial cable connectors as presently practiced, body portions of enlarged diameter and the cap portions of reduced diameter are cut from tubular stock having diameters corresponding to those of the body and cap. The ends of the body and cap are deburred, a taper is formed on one end of the cap, a flange is formed on the other end of the cap, and apertures are formed at predetermined locations in the body.

Thereafter, the caps are assembled to the bodies to form unitary coaxial cable connectors, either manually or automatically by means of relatively complex apparatus. In one such automatic apparatus, the bodies are first oriented and fed individually to holders mounted on an endless track. The caps are oriented and fed so that the flange of each one is force-fitted into the top of a body. The top of the body is rolled slightly over the flange, and the body is staked to hold the cap in place. A ring of solder is formed around the juncture of the cap and the body and melted to complete the body and cap portion of a coaxial cable connector.

Some advantages of this invention over the conventional manner of manufacturing coaxial cable connectors are a reduction in the number of pieces of apparatus required (only one is needed to practice this invention), and substantial economies in time and money. These advantages are realized because of the elimination of the steps of separately making the body and cap of the connector and thereafter assembling them, as briefly described above, with an attendant elimination of the several pieces of apparatus required for performing these steps. Because this invention may be practiced as a unitary operation, it lends itself to rapid recycling with minimum human effort.

Accordingly, it is the primary object of the present invention to provide new and improved methods of and apparatus for the shaping and forming from tubular stock, in a unitary operation, an apertured article having portions differing in transverse cross-sectional dimensions.

Another object is to provide methods of and apparatus for the shaping and forming of such articles in a unitary operation, wherein the shaping and forming are performed while the stock is rendered more ductile, or deformable without fracture, by the application of high hydrostatic pressure thereto.

Another object is to provide a method of and apparatus for shaping such articles wherein the article is formed on the end section of an indeterminate length of tubular stock and then severed therefrom while being shaped.

Another object of the present invention is to provide methods of and apparatus for forming apertures in articles, especially tubular articles, wherein the aperture may be formed while the material of the article is rendered more ductile, or deformable without fracture, by the application of high hydrostatic pressure thereto.

Another object is to provide a method of forming and shaping articles in which stock is deformed by extruding a portion of the stock back along its own length and by deforming the remaining stock including extruded material.

With these and other objects in mind, this invention contemplates a method and apparatus in which one end of a length of stock is extruded back along its own length to shape that end to the configuration of the first portion of the article. The remainder of the length is then internally subjected to high pressure to expand it to the configuration of the second portion of the article. Thereafter, at least one aperture is formed in the second portion while it is subjected to the high pressure.

This invention also contemplates a method and apparatus for forming apertures in stock, especially tubular stock, in which one surface of the stock is supported by pressurized fluid against a wall, while a cutting member or punch is advanced through the wall, through the stock, and into the pressurized fluid, the pressurized fluid acting in place of a female die. The cutting member is supported by the medium after it has been advanced through the stock.

Additionally, this invention contemplates a method for forming and shaping articles of differing transverse cross-sectional dimensions, in which an end portion of the stock is extruded back along its own length to form a first portion of the article. A second portion of the article is formed and shaped by deforming the stock, including some extruded material, by application of high hydrostatic pressure thereto.

Figure 2:
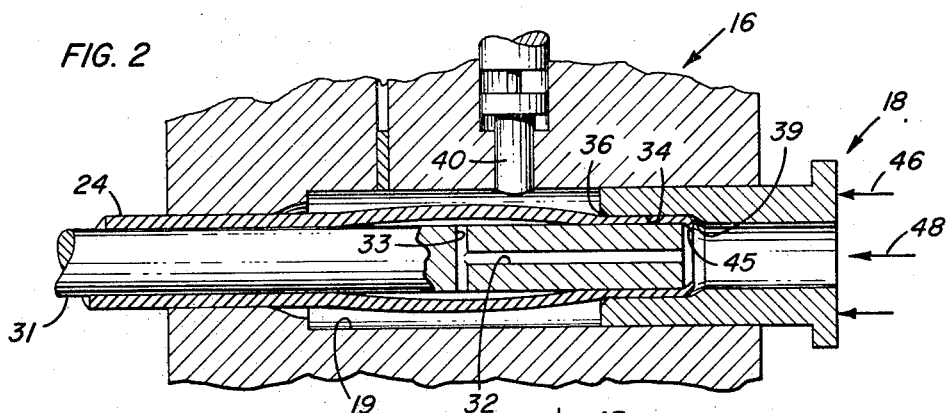
Figure 3:
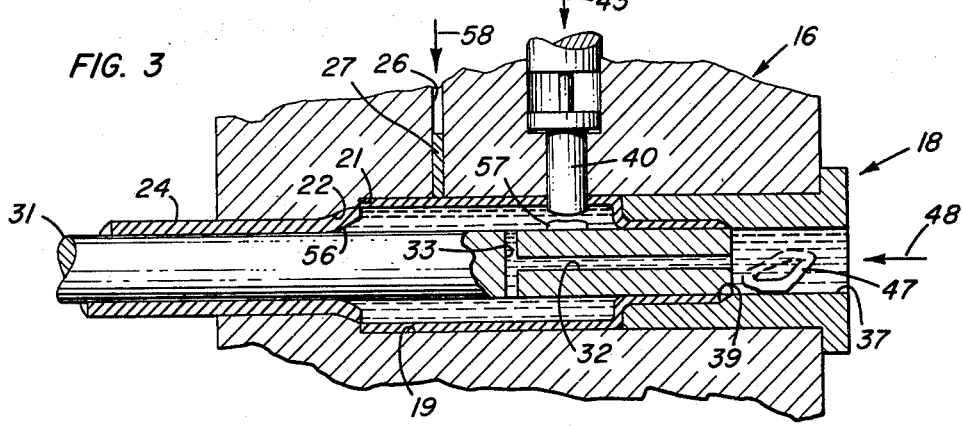
Figure 4:
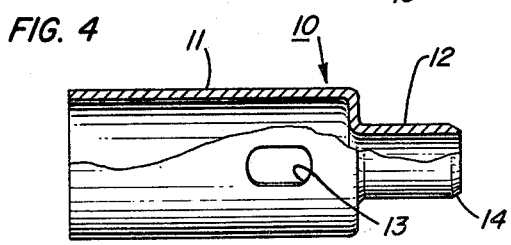

Other objects and advantages of the invention will become apparent by reference to the following detailed specification and accompanying drawings, wherein:

FIGS. 1, 2, and 3 schematically represent an apparatus in various stages of operation, for practicing the method of the invention;

FIG. 4 shows an article, a coaxial cable connector, which may be shaped from tubular stock in a single operation in accordance with the principles of this invention; and FIGS. 5 and 6 are schematic vertical cross-sectional views of an alternative apparatus, including a novel stock feeding mechanism, illustrating certain principles of the invention for shaping an article of the type illustrated in FIG. 4.

In FIG. 4, there is shown a coaxial cable connector 10 which may be shaped from a single length of tubular stock, in a single operation, in accordance with this invention. Connector 10 is a unitary structure including a cylindrical body portion 11 and a cylindrical cap portion 12. An aperture or window 13 is formed in body portion 11. Cap portion 12 is of a lesser diameter than body portion 11, and has a taper 14 formed on the end thereof. In actual practice, a center contact is mounted concentrically within the body and cap and at least two windows are formed to permit access to the center contact, these features being omitted in the interest of clarity.

METHOD AND APPARATUS (FIGS. 1-3)

FIGS. 1-3 illustrate an apparatus in various stages of operation practicing the method of this invention. The apparatus comprises a first die 16 and a second die 18 which is movable into a female die cavity 19 contained in first die 16.

In FIG. 1, cavity 19 has a configuration corresponding to that of body 11 (FIG. 4), its internal diameter being substantially equal to the outer diameter of body 11. The left-hand end of cavity 19 terminates in a shoulder 21 which intersects a curved portion 22. The height of shoulner 21 is substantially equal to the thickness of the walls of body 11. Curved portion 22 leads into an opening 23 in die 16 and has a diameter substantially equal to that of tubular stock 24.

A passageway 26, which extends through die 16, is provided for feeding a substantially incompressible hydraulic fluid 58, such as silicone oil, into cavity 19. A plug 27 is insertable into passageway 26 for selectively closing it off, and presenting a smooth surface with the walls of cavity 19. In certain modes of operation to be described infra, plug 27 is removed and pressurized fluid is fed through passageway 26 into internal cavity 19.

Stock 24 is slidable over a mandrel 31, which is supported at a predetermined position within cavity 19. Stock 24 and mandrel 31 extend out of opening 23. Mandrel 31 has formed therein an internal central bore 32 terminating in openings 33 which communicate with the interior surfaces of stock 24.

Second die 18 has an internal cavity 34 corresponding to the shape of cap 12. Cavity 34 has an internal diameter less than that of the outer diameter of stock 24, but greater than that of mandrel 31. Also, cavity 34 has a taper 36 formed on the end of die 18 which enters cavity 19. A central bore 37, of substantially the same diameter as mandrel 31, is provided in die 18 for feeding pressurized fluid. A stop shoulder 38 is formed on the end of die 18 and determines the leftward movement of die 18 into cavity 19.

A punch 40 is mounted in a cylinder 41 formed in the walls of die 16 for movement into cavity 19. Punch 40 is mounted on a ram 42 which is actuable by a press or other suitable device (schematically indicated as an arrow 43, FIG. 3).

PRACTICE OF THE METHOD

In a first mode of practicing the invention, wherein stock 24 may be composed of a copper, low carbon steel, or other normally ductile material, assume that plug 27 has been inserted into passageway 26 so that the walls of cavity 19 are smooth. Stock 24 is advanced by a suitable feed mechanism (schematically indicated by arrow 44, FIG. 1) over mandrel 31 to the predetermined position within cavity 19 (shown in FIG. 1) so that the end of stock 24 slightly overhangs the end of mandrel 31.

Die 18 is then advanced into cavity 16 by a press or other suitable mechanism (schematically indicated by arrow 46, FIGS. 1 and 2). As die 18 is advanced, taper 36 of cavity 34 guides the die onto the end of stock 24, and a flange 45 (FIG. 2) is initially formed. Since cavity 34 has a smaller internal diameter than the external diameter of stock 24, upon further anvancement of die 18 the material of stock 24 is extruded back along its own length into cavity 19 as cap 12 is formed. This action may be described as "ironing." As the material is extruded back during the formation of cap 12, the portion of the stock 24 within cavity 19 begins to bow or curve away from mandrel 31 (FIG. 2).

The extrusion of the right end of stock 24 continues until die 18 has been advanced a sufficient distance into cavity 19 to fully form cap 12. At this time, taper 39 of cavity 34 coacts with the end of mandrel 31 to trim flange 45 (FIG. 2) from stock 24, thereby forming taper 14 on cap 12. A piece of scrap 47 (dotted lines, FIG. 3) is formed by this trimming action.

When cap 12 is nearly formed, a substantially incompressible fluid 48, such as silicone oil, is fed under high pressure from a source (not shown) through bore 37 in die 18, into bore 32, and through openings 33 in mandrel 31. During this time, two things happen simultaneously, (1) the advancement of die 18 causes additional material to be curved away from mandrel 31 (FIG. 2), while (2) pressurized fluid 48 acts on the interior of stock 24 to expand it into the shape of cavity 19 (FIG. 3).

It should be noted that no additional stock 24 is advanced into cavity 19 through opening 23 to form body 11. Rather, the material which forms the body is that which originally occupies cavity 19, together with material advanced into cavity 19 by die 18 during the formation of the cap. The wall thickness of body 11 is, of course, determined by the amount of material expanded within cavity 19.

Control of this wall thickness may be exercised by changing the spacing between shoulder 38 and taper 39 on die 18. In general, the greater this spacing, the thicker will be the walls of body 11.

As seen in FIG. 3, during the expansion of stock 24 within cavity 19, the end of body 11 is severed from the indeterminate length of stock 24 by the sharp corner formed by juncture of shoulder 21 and curved section 22. This severance occurs since the height of shoulder 21 is equal to the thickness of the wall of body 11. This action leaves a lip or flange 56 on the end of stock 24 remaining on mandrel 31. Although flange 56 is left on stock 24, it has been found that a lip (not shown) is left on the end of body 11 if curved section 22 is not provided.

When the stock 24 is fully expanded within cavity 19, the material thereof is pressed by the action of fluid 48 against the walls of the cavity. Punch 40 is actuated by press 43 to cut window 13 (FIG. 4) in body 11 while the material is supported by the fluid against the action of the punch. The support provided by the fluid must be sufficient to hold the material of stock 24 firmly against the walls of the cavity while the punch penetrates the stock to cut window 13. A piece of scrap 46 formed by the punching operation is injected into the connector so that it is readily removed from the apparatus along with the completed connector.

It is known by those skilled in the art, that many metals and other materials, have a greatly increased capacity for deformation without fracture, if they are deformed when subjected to high hydrostatic pressure. These metals and other materials are known as "solid plastic" materials.

This principle is treated in P. W. Bridgman, "Large Plastic Flow and Fracture," published by McGraw-Hill Book Company of New York in 1952.

It has been discovered that the cutting of window 13 may be greatly facilitated by subjecting the material of stock 24 to high hydrostatic pressure while the above-described aperture cutting step is performed. In accordance with procedure, when stock 24 is fully expanded into cavity 19, it is subjected to uniform hydrostatic pressure due to the action of fluid 48 on one side thereof and the backup support pressure of the walls of cavity 19 on the other side thereof. The applied hydrostatic pressure must be sufficiently great to increase the ductility of the particular material of stock 24 to a level permitting the desired cutting operation without fracture of the material.

The level of hydrostatic pressure required for this purpose depends upon the material of stock 24 and the degree of deformation which it must undergo during the aperture cutting operation. It may be determined empirically for a particular aperture cutting operation by cutting a series of apertures in stock which is subjected to successively increased hydrostatic pressures. The required level of applied hydrostatic pressure is reached when a smooth-edged aperture is cut without fracture of the stock.

As an illustrative example, a smooth-edged window 13, approximately ½ by ¼ inch was formed in a body 11 of cartridge brass having a wall thickness of about 1/32 inch while the material of the wall was subjected to hydrostatic pressure of 60,000 p.s.i., the pressure also used to expand body 11. This window appeared to have been formed without deformation of the material surrounding the window. Hydrostatic pressures less than this produced windows having ragged, unsatisfactory edges, such edges evidencing fracture.

It will be noted that the above-described cutting procedures involve opposing a mechanical punch with a hydrostatic force rather than with a conventional female die. These procedures offer special advantages in forming apertures in tubular members, especially tubular members of small diameter, because of the difficulty in providing a mechanical die inside the member is avoided. It should be understood, however, that these procedures have general applicability in forming apertures of any configuration in both tubular and non-tubular workpieces.

As an alternative to the above-described aperture forming, body 11 may be supported by a backup member, located in cylinder 41, which is held against body 11 with a predetermined force. When the magnitude of the pressure of fluid 48 within body 11 exceeds the combined force of (1) the resistance to hydraulic cutting action of the material plus (2) the force of the backup member, fluid 48 cuts the material to form windows 13. For a more detailed description of cutting windows in tubular members in this manner, especially when forming several windows, see F. J. Fuchs, Jr. application Ser. No. 506,938, assigned to the same assignee as this invention.

At this stage of the practice of the method, connector 10 is fully formed. Die 18 is withdrawn from cavity 19 and connector 10 is removed therefrom. As will be described in detail infra, feeding mechanism 44 may be designed to retract stock 24 through opening 23 to iron down flange 56 (FIG. 3), and then to advance stock 24 to the predetermined position shown in FIG. 1. In practicing the method as described above, there is no scrap produced, except small pieces 47 and 57.

It is to be understood that stock 24 need not be of an indeterminate length. It may be of the exact length necessary to shape connector 10. In such a situation, curved portion 22 of cavity 19 would be eliminated and the end of the exact length of stock would abut shoulder 21 to prevent it from sliding on mandrel 31 when die 18 is advanced into cavity 19.

Alternatively, the length of stock need only be a little longer than necessary to shape connector 10; that is, the end of the stock would project slightly beyond the end of curved portion 22 into opening 23. In such a situation, the end of the length of stock projecting beyond curved portion 22 would be tightly held on mandrel 31 (by a collar or other suitable means) to prevent it from sliding out of cavity 19 when die 18 is advanced. Practicing the invention in this manner produces a small arount of scrap in addition to pieces 47 and 57.

There is another mode of practicing this invention which is particularly useful when shaping a workpiece, such as connector 10, from normally brittle, difficult-to-form materials. This mode is also useful with either normally brittle or with normally ductile, easy-to-form materials where the deformations introduced into stock 24 are large, for example, where body 10 is very large in diameter relative to cap 12.

In this mode of practicing the invention, after die 18 has been advanced partially into cavity 19, hydraulic fluid 58 (FIG. 3) is introduced through passageway 26 (plug 27 having been removed) from a source (not shown) under high pressure into cavity 19 to surround the section of stock 24 within cavity 19 (FIG. 1). Die 18 and cavity 19, and stock 24 and opening 23, fit closely enough to seal cavity 19 against leakage of fluid 58. Alternatively, seals may be mounted on die 18 or in cavity 19, and in opening 23, to insure sealing.

The section of stock within cavity 19 is subjected to hydrostatic pressure by fluid 58 acting on the exterior surfaces of the section against the backup pressure provided by mandrel 31. The hydrostatic pressure is of a magnitude sufficient to increase the ductility of the material of the section to a degree which permits the desired degree of expansion of stock 24 without fracture.

During the formation of cap 11 by the advancement of die 18, fluid 48 is introduced into mandrel 31 at a pressure of a sufficient magnitude to expand stock 24 into die cavity 19, simultaneously as it is being curved away from mandrel 31.

During such expansion, fluid 58 is bled away through passageway 26. However, throughout this expansion, fluid 58 is pressurized so that stock 24 is subjected to hydrostatic pressure sufficient to increase its ductility to a level permitting full expansion into cavity 19 without fracture of the stock. For stock 24 of normally ductile material, such as copper or low carbon steel, the applied hydrostatic pressure is sufficient to produce an increase in ductility, while for normally hard materials, such as high carbon steel or molybdenum, the applied hydrostatic pressure is sufficient to produce a brittle-to-ductile transition.

The level of hydrostatic pressure required for these purposes depends upon the material of stock 24 and the amount of deformation which it must undergo during full expansion into cavity 19. This pressure level may be determined empirically for a particular expansion operation by expanding a series of test specimens while subjecting the walls thereof to successively increased hydrostatic pressures. The minimum level is that at which satisfactory full expansion is accomplished without fracture of the stock.

In certain modes of practicing the invention, fluid 58 will not be introduced through passageway 26 until the cap 11 has been fully formed by die 18. The time at which fluid is introduced through passageway 26 depends on the particular material of stock 24.

Although the practice of the invention has been described as a series of incremental steps, an apparatus of the type illustrated in FIGS. 1–3 performs the entire forming operation as a unitary operation and may be recycled a relatively short time, on the order of a couple of seconds per cycle.

This invention has been illustrated in forming a generally cylindrical article of circular cross section from tubular stock, also of circular cross section. It will be understood that articles of rectangular and other cross sections may be formed from tubing with other than circular cross section, in accordance with the principles of this invention. Articles of varying wall thickness may be produced and tubular stock with other than uniform wall thickness may be employed. Additionally, portions of the articles formed may be tapered as in the case with certain artillery and small arms shell cases.

ALTERNATIVE APPARATUS (FIGS. 5 AND 6)

FIG. 5 shows alternative apparatus for practicing this invention. In many respects, this apparatus is similar to that of FIGS. 1–3; hence, like reference numerals will be employed where possible.

Referring to FIG. 5, the apparatus comprises a first die 16 and a second die 18 movable into a cavity 19 within die 16. Cavity 19 has a shoulder 21 which intersects with a curved portion 22 leading into an opening 23, which closely fits about stock 24.

A mandrel 31 is mounted in a predetermined position within cavity 19 and has an internal central bore 32 terminating in openings 33. Stock 24 is slidably movable over mandrel 31.

A punch 40 is mounted in a cylinder 41 formed in die 16, and is movable into cavity 19 by a ram 43. A fluid passageway 26 is formed in die 16 and communicates with cavity 19. A plug 27 is insertable into passageway 26 to close it off so that the walls of cavity 19 present smooth surfaces during certain modes of operation of the apparatus, to be described infra.

Second die 18 comprises an outer ram 61 movable (by a press indicated schematically by arrow 68) in a cylinder 62, and an inner ram 63 having formed therein a die cavity 34. Inner ram 63 is mounted concentrically within outer ram 61 for slidable movement therethrough (by a press indicated schematically by arrow 69).

A plurality of friction blocks 64, composed of nylon or other suitable material, are mounted in radially disposed cylinders 65 formed in ram 61 opposite die cavity 34. Set screws 66 are located behind blocks 64 for adjusting their position within their respective cylinders.

As described supra, a flange 56 (FIG. 3) is left on the end of stock 24 when connector 10 is fully shaped and severed from the indeterminate length of stock 24. The apparatus illustrated in FIGS. 5 and 6 includes a feeding mechanism 71, which cooperates with die 16 to flatten flange 56, and then to feed a new length of stock 24 to the predetermined position within cavity 19. This feeding mechanism 71 permits the use of an indeterminate length of stock 24 and automatic, rapid cycling of the apparatus.

Referring to FIG. 5, feeding mechanism 71 includes a housing 72 mounted for movement on a support 73. Frst and second sets of tapered, segmented blocks, 74 and 76 respectively, are slidably mounted in tapered bores within housing 72, so that the inner surfaces 79 of the blocks having smaller diameters abut near a center point 81 of housing 72. First blocks 74 are held within housing 72 by a relatively light retaining spring 77, and second blocks 76 are held therein by a relatively strong retaining spring 78. The interior surfaces of first and second blocks 74 and 76 define an opening 82 which is dimensioned to permit stock 24 to be slidably moved therethrough.

Referring to FIG. 6, an actuator mechanism 87 is mounted on support 73. Actuator mechanism 87 is located a predetermined distance away from and aligned with die 16, so that mandrel 31 and stock 24 can pass through the actuator and feeding mechanisms, and into die 16. The predetermined distance is determined in accordance with the amount of stock 24 that is to be fed into cavity 19 when stock 24 is advanced to the predetermined position (FIGS. 1 and 5).

Actuator mechanism 87 includes a housing 88 having mounted therein a piston 89, which is urged rightwardly by a strong spring 91. Piston 89 has a collar 92 formed thereon, which is movable betwen stop wall 93 and wall 94 formed in cylinder 96 of housing 88.

Feeding mechanism 71 is movable between die 16 (FIG. 5) and actuator mechanism 87 by a piston rod 97, and is cycled by a double acting hydraulic cylinder, or other suitable mechanism, schematically indicated by arrow 98 (FIG. 6).

OPERATION OF APPARATUS (FIG. 5)

The operation of the apparatus shown in FIG. 5 can be understood by reviewing the description of the several embodiments of the method of the invention previously set forth with respect to FIGS. 1–3. However, a general description of the operation of the apparatus shown in FIG. 5, and a detailed description of the operation of the feed mechanism follows.

Assume that a cycle of operation of the apparatus has just been completed, that feed mechanism 71 is in the position shown in FIG. 5, that a completed connector 10 has just been removed from die cavity 19, and that stock 24 has been advanced to the position shown.

Outer ram 61 and inner ram 63 are now advanced in unison, so that outer ram 61 supports the walls of cavity 34 as it is moved onto the end of stock 24 to shape cap 11. Substantially at the same time that cap 11 is formed, outer ram 61 is bottomed in cylinder 62, but inner ram 63 continues to be advanced.

When ram 61 is bottomed in cylinder 62, pressurized hydraulic fluid 48 is fed through opening 37 in inner ram 63, into bore 32 and out of openings 33 to shape stock 24 into cavity 19. The combined action of pressurized fluid 48 and the advancement of inner ram 63 to curve stock 24 away from mandrel 31 causes stock 24 to be shaped into cavity 19. Upon complete shaping, body 11 is severed from stock 24 by the juncture of shoulder 21 and curved portion 22, leaving flange 56 (FIG. 3). Punch 40 is then actuated (mechanically, hydraulically, or by any other suitable mechanism) to form windows 13 in body 11. Die 18 is withdrawn from die 16, and a connector 10 is removed therefrom. Friction blocks 64 impose a slight drag on the movement of inner ram 63 to assure smooth movements of ram 63 within ram 61.

OPERATION OF FEED MECHANISM

In the operation of feeding mechanism 71 and referring first to FIG. 5, assume that a connector 10 has just been formed and that flange 56 (FIG. 3) remains on the end of stock 24. The apparatus is now ready to be recycled. At this point, the inner surfaces 79 of first blocks 74 are located leftward of center point 81; therefore, they are loosely held in housing 72 by spring 77 and exert relatively little frictional gripping force on stock 24. The inner surfaces 79 of second blocks 76 are also located leftward of center point 81 and are wedged in housing 72. Second blocks 76 are held there by spring 78.

Double acting cylinder 98 (FIG. 6) is now actuated to the left to move housing 72 away from die 16 and towards actuator mechanism 87. Second blocks 76 would ordinarily have a tendency to frictionally engage stock 24, and slide out of housing 72 while it is being moved. However, spring 78 is of sufficient strength to maintain blocks 76 within housing 72, so that blocks 74 and 76 maintain their relative positions shown in FIG. 5. During the movement of feeding mechanism 71 away from die 16, neither blocks 74 nor blocks 76 frictionally grip stock 24 with sufficient force to move stock 24. Consequently, stock 24 does not move with respect to mandrel 31 during the leftward movement of feeding mechanism 71.

Referring to FIG. 6, feeding mechanism 71 continues to be moved away from die 16 until first blocks 74 about piston 89. Such abutment causes the inner surfaces 79 of first blocks 74 to be wedged rightwardly of center point 81, thereby moving the inner surfaces 79 of second blocks 76 rightward of center point 81. First blocks 74 are now frictionally locked on stock 24.

Further leftward movement of feeding mechanism 71 compresses spring 91 and stock 24 is moved leftward over mandrel 31 the distance permitted by walls 93 and 94. Consequently, flange 56 of stock 24 is pulled into opening 23 and flattened against mandrel 31. When collar 92 of piston 89 abuts wall 94, cylinder 98 reverses direction to move feeding mechanism 71 rightwardly, thereby moving stock 24 rightwardly since first blocks 74 are still locked thereon.

As first blocks 74 become disengaged from piston 89, spring 78 moves second blocks 76 leftward so that they become wedged in housing 72, thereby moving the inner surfaces 79 leftward of center point 81. Second blocks 76 now frictionally grip stock 24 so that it is moved rightwardly and advanced to the predetermined position shown in FIG. 5 as feeding mechanism 71 is moved rightward by piston rod 97.

Appropriate controls may be associated with the apparatus shown in FIGS. 1–3, and 5 and 6, to render automatic the sequence of operation of the various parts in the various modes of practicing the invention as described. Given the above-described cycles of operation suitable controls may be devised by those skilled in the art and need not be set forth in this application. Also, these cycles may be controlled manually. Further, the apparatus shown in FIG. 5 can be operated to practice any of the above-described methods of this invention.

It will be understood that the above-described embodiments of this invention are merely illustrative of the principles of the invention, and that other embodiments may be devised without departing from the scope of the invention.

What is claimed is:

1. In a method of shaping an apertured article having a first portion of one diameter and a second portion of of larger diameter from a length of tubular stock, the steps of:
   extruding one end of the stock back along its length to shape that end to the desired configuration of the first portion of the article,
   expanding the remainder of the stock to the desired configuration of the second portion by applying high hydrostatic pressure internally thereto, and
   forming at least one aperture in the second portion while it is subjected to the high pressure.

2. A method according to claim 1, wherein the expanding and aperture forming steps are accomplished while the remainder of the stock is subjected to hydrostatic pressure sufficient to increase its ductility to a level permitting such expanding and aperture forming without fracture of the workpiece material.

3. A method according to claim 1, wherein the extruding step is accomplished by advancing a die having an internal cavity corresponding to the configuration of the first portion onto the end of the stock.

4. A method according to claim 1, wherein the expanding step is accomplished by subjecting the interior of the remainder of the stock to hydraulic fluid under a sufficient pressure to cause expansion of the stock into a die cavity having a shape corresponding to the desired configuration of the second portion.

5. A method according to claim 1, wherein the article is shaped from an indeterminate length of tubular stock, the additional step of:
   severing the second portion of the article from the indeterminate length substantially simultaneously as the remainder is expanded to the shape of the second portion.

6. A method according to claim 4, wherein the aperture forming step is accomplished by advancing a punching member through a wall of the second portion while it is subjected internally to the pressurized fluid and confined externally by the die cavity.

7. In a method of shaping articles having a body portion and a cap portion from tubular stock, the steps of:
   placing a section of an indeterminate length of tubular stock within a female die cavity which has a configuration corresponding to the body portion;
   advancing a die having an internal cavity of a configuration corresponding to the cap portion onto the end of the stock within the female cavity, extruding a portion of the material thereof back along its own length and shaping the end of the length to the configuration of the cap portion;
   subjecting the interior of the remainder of the section to pressurized fluid, expanding it into the female cavity, and shaping the remainder to the configuration of the body portion;
   severing the remainder from the indeterminate length as the stock is expanded into the female cavity; and
   forming at least one aperture in the body portion while the body portion is subjected internally to the pressurized fluid and confined externally by the female cavity.

8. A method according to claim 7, wherein at least one aperture is formed in the remainder while the material thereof is subjected to hydrostatic pressure at a level permitting the formation of the aperture without fracture.

9. A method according to claim 7, wherein the exterior of the remainder is surrounded by pressurized fluid during the expansion thereof and the externally and internally applied fluids subject the material thereof to hydrostatic pressure at a level permitting full expansion thereof within the female cavity without fracture.

10. The method of shaping articles according to claim 9, wherein the stock is composed of a relatively brittle material and the remainder is subjected to hydrostatic pressure sufficient to cause it to undergo a brittle-to-ductile transition.

11. A method of shaping articles having a body portion and a cap portion from an indeterminate length of tubular stock in a single operation, comprising the steps of:
   mounting an indeterminate length of tubular stock about a mandrel having a section thereof located in a female die cavity which has a configuration corresponding to the body portion;
   advancing the stock over the mandrel to position a section thereof within the female die cavity;
   advancing a die having an internal cavity corresponding to the configuration of the cap portion onto the end of the section within the female die cavity to iron a portion of the material of it back along its own length, thereby reducing the wall thickness of the end of the section and shaping it to the configuration of the cap portion;
   forcing hydraulic fluid into the female cavity and also into the section so that the fluid is applied to both sides of the walls of the section;
   pressurizing the fluid within the female cavity so that the section is subjected to hydrostatic pressure sufficient to increase the ductility of the material thereof to a level permitting full expansion of the material of the section into the body portion without fracture thereof;
   pressurizing the fluid forced into the section to a level greater than that of the fluid in the female cavity, causing the remainder of the section to expand into the female cavity and take the shape of the body portion;
   severing the remainder from the indeterminate length by applying a sharp edge thereto while the remainder is being expanded into the female cavity; and
   punching at least one aperture in the body portion while it is subjected internally to pressurized fluid and externally confined by the female cavity.

12. A method of shaping articles according to claim 11, wherein the stock is composed of a relatively brittle material, and the section is subjected to hydrostatic pressure sufficient to cause it to undergo a brittle-to-ductile transition while it is being expanded, severed, and having an aperture formed therein.

13. A method of cutting a workpiece, without resort to a female die, to form an aperture therein, comprising the steps of:
    placing one surface of the workpiece against a wall so that portions thereof to be cut and removed are opposite a cutting member projectable from the wall;
    applying a pressurized fluid to the opposed surface of the workpiece to support the workpiece against the wall and against the cutting action of the cutting member; and
    while the workpiece is supported by the pressurized fluid, advancing the cutting member from the wall, through the workpiece, and into the fluid to cut the workpiece and remove a slug therefrom to form said aperture.

14. A method according to claim 13, wherein the workpiece is a solid plastic material and the pressure of the pressurized fluid is increased to a level sufficient to cause the workpiece to increase in ductility sufficiently to permit the workpiece to be cut and the slug removed without fracture of the workpiece material.

15. A method of cutting an aperture in a wall of a tubular workpiece, without resort to a female die, comprising the steps of:
    placing a tubular workpiece within a closed female cavity so that the exterior surfaces of the workpiece are in contact with interior walls of the cavity and the portion to be cut is opposite a punching member;
    introducing a fluid into the interior of the workpiece;
    pressurizing the fluid within the cavity to subject the workpiece to hydrostatic pressure sufficient to increase its ductility to a level permitting cutting of the workpiece material without fracture thereof; and
    advancing a punching member from the wall, through the workpiece, and into the fluid to cut the workpiece and remove a slug therefrom to form said aperture.

16. Apparatus for shaping an article having a body portion and a cap portion from a length of tubular stock in a single operation, comprising:
    a first die defining a first female cavity having a configuration corresponding to the shape of the body portion of the article,
    a mandrel extending into the first cavity and having a bore therethrough terminating in openings which communicate with the interior of the first cavity,
    a second die defining a second female cavity having a configuration corresponding to the shape of the cap portion of the article and mounted for movement into the first cavity, and
    at least one punch assembly mounted in the walls of the first die and having a punching member movable into the first cavity in a direction transverse to the movement of the second die.

17. Apparatus according to claim 16, wherein:
    the first die is provided with a passageway for conducting fluid to the exterior of stock within the first female cavity, and the second die is provided with means for conducting fluid to the bore within the mandrel.

18. Apparatus according to claim 16 for shaping such article from an indeterminate length of tubular stock, further comprising:
    means for severing the body portion from the indeterminate length of tubular stock as the body portion is expanded within the first cavity.

19. Apparatus according to claim 18, wherein the severing means includes a shoulder formed on an interior wall of the first cavity, whereby a lip is left on the end of the indeterminate length, the apparatus further comprising:
    means for flattening the lip and for advancing a new section of the indeterminate length into the first cavity upon severance of the body portion.

20. Apparatus according to claim 18, wherein the flattening and advancing means comprises:
    a reciprocable housing containing oppositely disposed, adjacent tapered bores;
    first and second sets of segment blocks, having respective tapers complementary to those of the bores and mounted in the respective bores so that the smaller ends of the sets of blocks face each other within the bores, the sets of blocks having a central bore therethrough of substantially the same diameter as the stock;
    a spring biased piston mounted in the path of reciprocation of the first set of blocks; and
    means for moving the housing and blocks away from the first die to slide the blocks over the stock until the first set of blocks abut the piston and are driven thereby to grip the stock, this grip being maintained by action of the piston to pull the stock the length of the piston's stroke through one opening in the first die to flat the lip, and until the second set of blocks grips the stock to advance it into the first die cavity upon further reciprocation of the housing.

21. In a method of shaping and forming from a length of stock, an article having a first portion of one configuration and a second portion of a different configuration, the steps of:
    extruding at least a portion of one end section of the stock back along its length to shape that end section to the desired configuration of the first portion of the article; and
    applying hydrostatic pressure against another section of the stock, said other section including some of the extruded stock, to shape and form said other section to the desired configuration of said second portion.

22. In a method of shaping an article having a first portion of one configuration and a second portion of a different configuration from a length of tubular stock, the steps of:
    extruding one end of the stock back along its length to shape that end to the desired configuration of the first portion of the article; and
    deforming the remainder of the stock, including some of the extruded stock, to the desired configuration of the second portion by applying hydrostatic pressure thereto.

23. A method according to claim 22 wherein the remainder of the stock is deformed by applying the hydrostatic pressure internally thereto, expanding the remainder to the desired configuration of the second portion.

References Cited

UNITED STATES PATENTS

| | | | |
|---|---|---|---|
| 2,802,530 | 8/1957 | Kaufman | 83—169 |
| 2,870,629 | 1/1959 | Willis | 29—213 |
| 3,160,130 | 12/1964 | Pesar | 29—421 |
| 3,358,489 | 12/1967 | Hutchins | 72—62 |

RICHARD J. HERBST, Primary Examiner

U.S. Cl. X.R.

72—58, 61; 83—53, 54

UNITED STATES PATENT OFFICE
CERTIFICATE OF CORRECTION

Patent No. 3,487,668      Dated January 6, 1970

Inventor(s) F. J. Fuchs, Jr.

It is certified that error appears in the above-identified patent and that said Letters Patent are hereby corrected as shown below:

In the specification, Column 1, line 46, "utilized" should have been --utilize--. Column 3, lines 39 and 40, "shoulner" should have been --shoulder--. Column 4, line 14, "anvancement" should have been --advancement--. Column 7, line 10, "in" should have been --is--; line 60, after "having" insert --the--. Column 8, line 47, after "MECHANISM" insert --(FIGS. 5 and 6)--; line 73, "about" should have been --abut--.

SIGNED AND SEALED

JUL 21 1970

(SEAL)
Attest:

Edward M. Fletcher, Jr.
Attesting Officer

WILLIAM E. SCHUYLER, JR.
Commissioner of Patents